United States Patent
Lewis et al.

(10) Patent No.: US 7,114,712 B2
(45) Date of Patent: *Oct. 3, 2006

(54) NON-SLIP RATE-PLATED STA-BAR BUSHING

(75) Inventors: James Lewis, Sandusky, OH (US); Richard Novy, West Lake, OH (US); Robert Missig, Berlin Heights, OH (US); Robert Ferguson, Sylvania, OH (US); Andrew Franzen, Sandusky, OH (US)

(73) Assignee: The Pullman Company, Milan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/878,622

(22) Filed: Jun. 28, 2004

(65) Prior Publication Data

US 2005/0029723 A1 Feb. 10, 2005

Related U.S. Application Data

(63) Continuation-in-part of application No. 10/075,062, filed on Feb. 13, 2002, now Pat. No. 6,755,403, which is a continuation-in-part of application No. 09/408,406, filed on Sep. 29, 1999, now abandoned.

(51) Int. Cl.
*F16F 7/00* (2006.01)
*B60G 21/05* (2006.01)

(52) U.S. Cl. ............... 267/141; 267/140.12; 267/152; 280/124.106

(58) Field of Classification Search ............ 267/141, 267/141.2, 140.11, 140.12, 140.13, 140.14, 267/140.15, 35, 152, 153; 280/124.106, 280/124.1

See application file for complete search history.

(56) References Cited

U.S. PATENT DOCUMENTS

| | | | | | |
|---|---|---|---|---|---|
| 1,827,267 | A | * | 10/1931 | Short | 29/898.04 |
| 3,230,000 | A | * | 1/1966 | Simpson | 403/228 |
| 4,883,287 | A | * | 11/1989 | Murakami et al. | 280/124.135 |
| 5,328,160 | A | * | 7/1994 | McLaughlin | 267/141.3 |
| 5,397,112 | A | * | 3/1995 | Roth et al. | 267/140.12 |
| 6,755,403 | B1 | * | 6/2004 | Lewis et al. | 267/141 |

FOREIGN PATENT DOCUMENTS

FR 0893291 B1 * 3/2002

* cited by examiner

*Primary Examiner*—Pam Rodriguez
(74) *Attorney, Agent, or Firm*—Harness, Dickey & Pierce, PLC

(57) ABSTRACT

A stabilizer bar assembly has a stabilizer bar and a pair of bushing assemblies. Each bushing assembly has an elastomeric bushing disposed around the stabilizer bar and an outer metal member disposed around the elastomeric bushing. The elastomeric bushing has a molded in rate plate to increase the stiffness of the elastomeric bushing. The outer metal member compresses the elastomeric bushing between the stabilizer bar and the outer metal member to a prespecified percent of compression. When the stabilizer bar rotates with respect to the outer metal member, the compression of the elastomeric bushing stops movement between the elastomeric bushing and the stabilizer bar and between the elastomeric bushing and the outer metal member. A fastening strap is attached to the outer metal member to attach the stabilizer bar assembly to a vehicle.

34 Claims, 4 Drawing Sheets

NON-SLIP RATE-PLATED STA-BAR BUSHING

CROSS-REFERENCE TO RELATED APPLICATIONS

This application is a continuation-in-part of U.S. patent application Ser. No. 10/075,062 filed on Feb. 13, 2002, now U.S. Pat. No. 6,755,403 which is a continuation-in-part of U.S. patent application Ser. No. 09/408,406 filed Sep. 29, 1999, now abandoned.

FIELD OF THE INVENTION

The present invention relates to a stabilizer bar bushings. More particularly, the present invention relates to a stabilizer bar bushing which incorporates anti-slip features to eliminate slip between the bushing and the stabilizer bar and which incorporates a rate-plate to reduce and/or eliminate walk-out.

BACKGROUND OF THE INVENTION

Conventional motor vehicle suspension systems often include one or more stabilizer bars to control the degree of roll of the motor vehicle during cornering or other vehicle maneuvers. A typical stabilizer bar is generally U-shaped having a long intermediate portion disposed laterally with respect to the motor vehicle and a pair of relatively short end portions extending forwardly or rearwardly to connect to a corresponding pair of suspension arms or wheel hubs. The intermediate portion normally is connected to the underside of the vehicle by one or more bracket assemblies.

The mounting bracket assembly for the intermediate portion of the stabilizer bar typically includes an elastomeric bushing, sometimes termed an insulator, and a bracket which is secured to the underside of the vehicle. The elastomeric bushing is located between the stabilizer bar and the bracket to support and isolate the stabilizer bar. In some applications it is desirable to use an elastomeric bushing that permits the stabilizer bar to rotate freely about the axis of the intermediate portion of the stabilizer bar. In other applications, it is desirable to allow partial wind-up of the bushing and then allowing the bushing to slip for relative torsional travel between the bushing and the bar. In still other applications, attempts are made to eliminate the slippage of the bushing such that all rotation of the stabilizer bar is resisted by wind-up of the bushing.

The designs that allow rotation between the bar and the bushing have attempted to minimize friction at the bushing/stabilizer bar interface by employing low-friction materials as liners covering the bore of the bushing or by adding lubricants between the bushing and the stabilizer bar. Commonly used materials for bushing liners are polyester or polytetra fluoroethylene while silicone greases have been utilized as lubricants. The primary disadvantage of these designs is that the liner wears or the lubricant dissipates resulting in an unacceptable audible squawk in the vehicle. Also, with these designs, environmental contamination can result in premature wear of the liner or premature dissipation of the lubricant thus leading to the audible squawk.

The designs that allow partial wind-up and then allow slippage of the stabilizer bar with respect to the bushing suffer from the same disadvantages as the designs that allow total rotation in that early wear and/or contamination of the interface between the bar and the bushing can lead to an audible squawk.

The designs that attempt to eliminate all slippage of the bushing have been successful for limited rotation of the stabilizer bar with respect to the bushing, but larger rotation of the stabilizer bar has caused deterioration of the bushing and/or slippage of the bushing. In order to overcome these problems, some prior art designs have incorporated flats on the stabilizer bar or other components which resist rotation of the bushing. While the incorporation of flats has resisted the larger amounts of rotation, the costs and complexities of these designs have limited their applicability.

Still other designs that attempt to eliminate all slippage of the bushing utilize a mechanically bonded bushing assembled over the stabilizer bar and then compress this bushing into an outer sleeve/bracket assembly. While these designs have and continue to meet the needs of the vehicle designers, the bushing which is compressed and assembled into the outer sleeve/bracket assembly can be subject to walk-out of the bushing during vehicle operation.

The continued development of stabilizer bar bushings and attachment systems has been directed toward designs which provide additional durability, eliminate the audible squawking by eliminating the rotation between the stabilizer bar and the bushing but yet still perform the required isolation between the stabilizer bar and the vehicle, and reduce and/or eliminate the bushing walk-out tendency.

SUMMARY OF THE INVENTION

The present invention provides the art with an attachment between the stabilizer bar and the supporting structure of the vehicle which will improve the durability of the bushing, provide isolation for the stabilizer bar, allow for the proper positioning of the stabilizer bar relative to the frame and will eliminate and/or reduce the bushing walk-out tendency. The present invention provides for radial, axial, torsional and conical loading of the stabilizer bar due to jounce and rebound of the suspension. The present invention provides this relative movement between the stabilizer bar and the frame without slippage between the bushing and the stabilizer bar thus eliminating the potential for an audible squawk.

The present invention utilizes a mechanically bonded bushing assembly assembled over the stabilizer bar and then compressed into an outer sleeve/bracket assembly. The bracket assembly is provided with slotted holes to compensate for the stabilizer bar assembly and the vehicle body tolerance stack-ups. This preassembly of the bushing assemblies and the stabilizer bar also allows this assembly to be supplied directly to the assembly plants ready for vehicle assembly. This is opposed to the prior art which supplies the stabilizer bar and the bushings as separate components requiring sub-assembly at the vehicle assembly plant. The stabilizer bar attachment of the present invention provides both axial and lateral location proximate to the vehicle body and suspension attachments, the torsional resistance of the elastomeric member provides enhanced anti-roll capabilities, and due to the lack of slippage between the elastomeric member and the bore, a noise free pivot attachment with enhanced longevity and product life is provided. In addition, the design for the bushing assembly eliminates and/or reduces the tendency of the bushing assembly to walk-out of the sleeve/bracket assembly.

The bushing assembly of the present invention includes an elastomeric bushing within which a rate plate in the form of a rigid cylinder is molded. The rate plate is bonded to the bushing on both its interior and exterior surface. The rate plate adds considerable radial, torsional, conical and axial rate stiffness. In addition, the rate plate increases the confinement of the elastomeric bushing which is a key design consideration for bushing walk-out.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
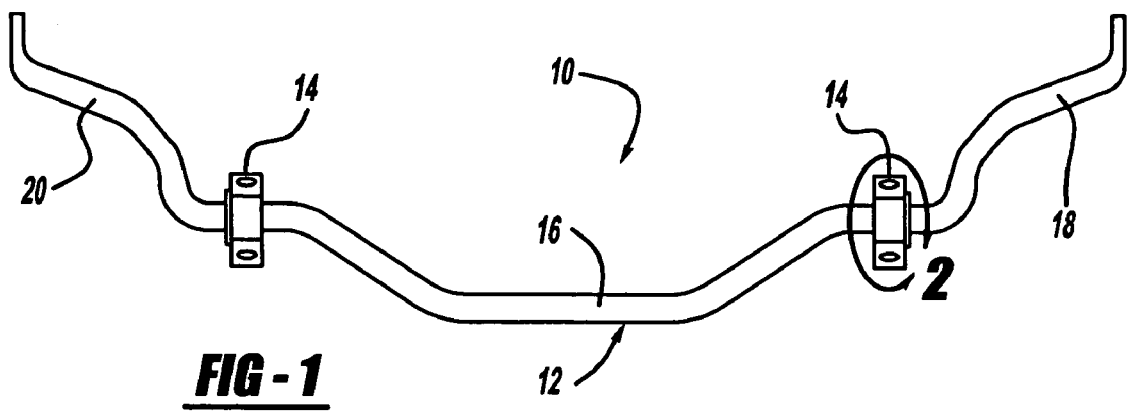
FIG. 1 is a plan view of a stabilizer bar assembly incorporating the unique bushing assembly in accordance with the present invention.
Figure 2:
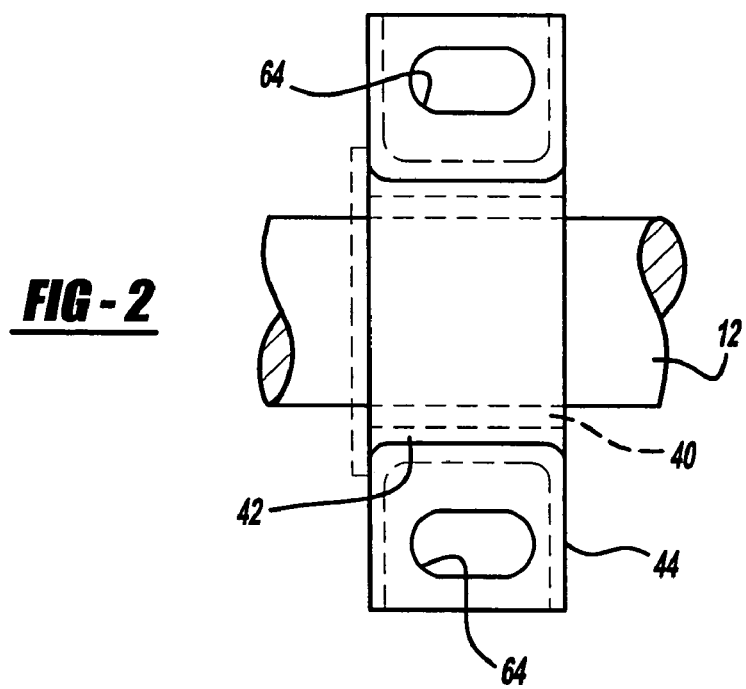
FIG. 2 is an enlarged view of the stabilizer bar bushing assembly in accordance with the present invention.
Figure 3:
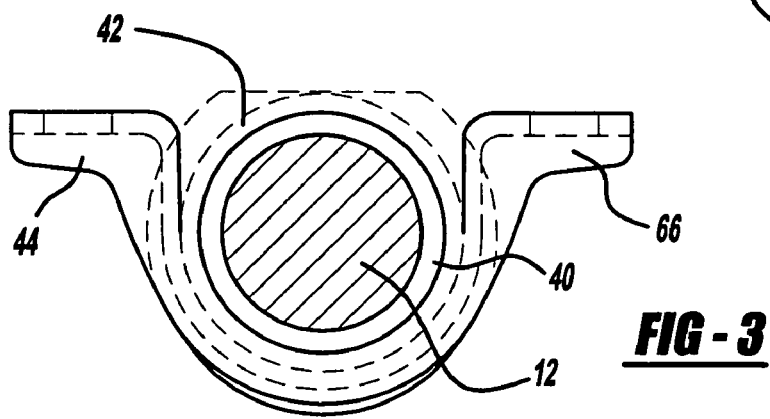
FIG. 3 is an end view of the stabilizer bar bushing assembly shown in FIG. 2.

Referring now to the drawings in which like reference numerals designate like or corresponding parts throughout the several views, there is shown in FIG. 1 a stabilizer bar assembly which is identified generally by the reference numeral 10. Stabilizer bar assembly 10 comprises a stabilizer bar 12 and a pair of stabilizer bar bushing assemblies 14. Stabilizer bar 12 is a generally U-shaped bar having a center sectional 16 and a pair of end sections 18 and 20. Center section 16 is designed to be secured to the sprung mass of the vehicle by stabilizer bar bushing assemblies 14. End sections 18 and 20 are designed to be secured to the left and right suspension control arms or hubs (not shown) of the vehicle to which stabilizer bar assembly 10 is designed for.

The various bends and unique configurations for stabilizer bar 12 permit stabilizer bar assembly 10 to function in the particular vehicle without interfering with the components of the vehicle which are positioned within the general area of stabilizer bar assembly 10.

Figure 4:
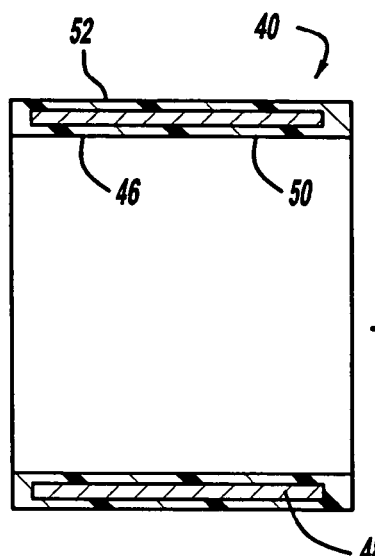
FIG. 4 is a cross-sectional view of the elastomeric bushing for the bushing assembly of the present invention.
Figure 5:
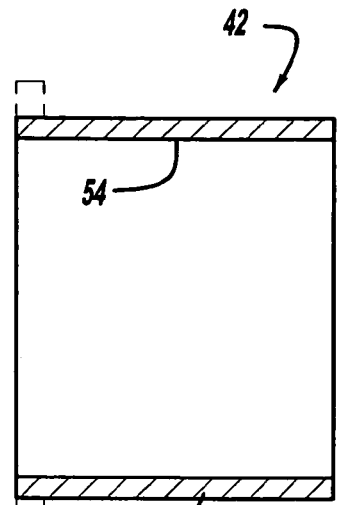
FIG. 5 is a cross-sectional view of the outer tube for the bushing assembly of the present invention.
Figure 6:
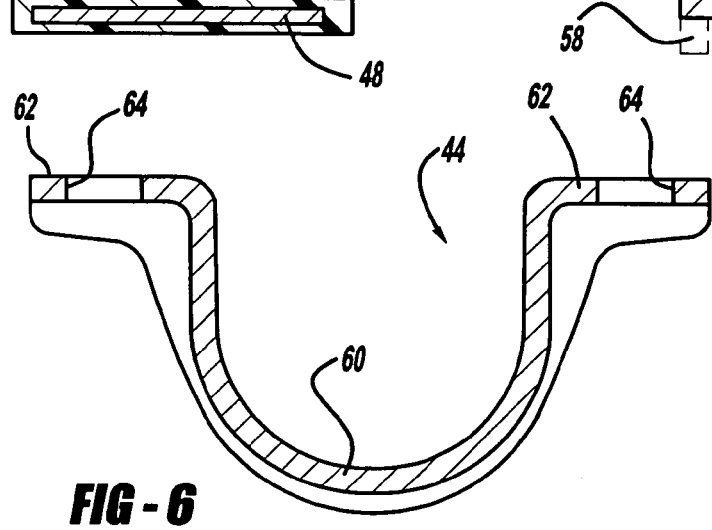
FIG. 6 is a cross-sectional view of the strap for the bushing assembly of the present invention.

Referring now to FIGS. 2–7, stabilizer bar bushing assemblies 14 comprises an elastomeric bushing assembly 40, an outer metal member 42 and a fastening strap 44. As shown in FIG. 4, elastomeric bushing assembly 40 comprises an elastomeric bushing 46 and a rate plate 48 preferably molded within elastomeric bushing 46. Elastomeric bushing 46 is an annular member which includes an inside diameter 50 having a specified dimension and an outside diameter 52 having a specified dimension. Inside diameter 50 is designed to be smaller than the bar diameter for stabilizer bar 12. Outside diameter 52 is designed to be larger than an inside diameter 54 of outer metal member 42 when elastomeric bushing assembly 40 is assembled over stabilizer bar 12. This dimensioning provides a specified amount of compression for elastomeric bushing assembly 40 to provide the mechanical friction between elastomeric bushing assembly 40 and stabilizer bar 12 and between elastomeric bushing assembly 40 and outer metal member 42. This mechanical friction allows for torsional wind-up and deflection of elastomeric bushing assembly 40 to prevent any slippage between the mating components.

In the preferred embodiment, the percent compression for elastomeric bushing assembly 40 after it is assembled over stabilizer bar 12 and within outer metal member 42 is between 20% to 60% compression and more preferably it is between 35% and 50%. When the percent of compression for elastomeric bushing assembly 40 is less than 20%, slippage of elastomeric bushing assembly 40 can occur. When the percent of compression for elastomeric bushing assembly 40 exceeds approximately 60%, the assembly of elastomeric bushing assembly 40 and stabilizer bar 12 within outer metal member 42 becomes difficult and/or impractical.

Rate plate 48 is a cylindrical component preferably made of metal which is disposed within elastomeric bushing 46 between inside diameter 50 and outside diameter 52. The diameter for rate plate 48 is designed to be at a specified position between diameters 50 and 52 and this specified position can vary depending on the application.

Figure 7:
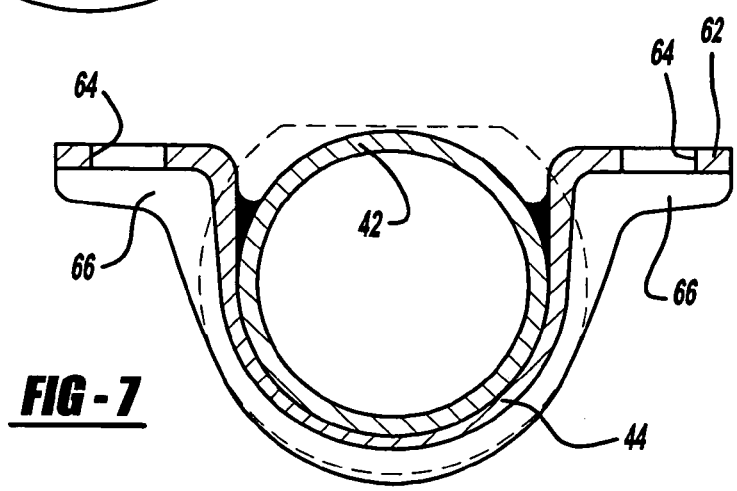
FIG. 7 is an end view of a typical strap and outer metal member for the assembly of the present invention.

Outer metal member 42 is a tubular member having a cylindrical body 56 defining inside diameter 54 and an optional flanged end 58 shown in phantom in the figures. While outer metal member 42 is illustrated in phantom as being provided with flanged end 58, it is within the scope of the present invention to provide outer metal member 42 with a non-flanged end. Flanged end 58 can be utilized to aid in the assembly of stabilizer bar bushing assemblies 14 onto stabilizer bar 12 if desired. In the preferred embodiment, outer metal member 42 is provided without flange 58 making outer metal member 42 a cylindrical tube. Fastening strap 44 comprises a C-shaped body 60 and a pair of flanges 62. C-shaped body 60 is sized to mate with the outside diameter of outer metal member 42 and as shown in FIG. 7. Fastening strap 44 is secured to outer metal member 42 by welding or other methods known in the art. Each flange 62 extends outward from body 60 and defines a slotted hole 64 which is used to secure stabilizer bar assembly 10 to the sprung mass of the vehicle. The slotting of holes 64 compensate for the various tolerance stack-ups which occur in the vehicle itself as well as the tolerances in stabilizer bar assembly 10. Each flange 62 may include a pair of gussets 66 which can provide support for securing stabilizer bar assembly 10 to the vehicle.

Once stabilizer bar bushing assemblies 14 are assembled to stabilizer bar 12, stabilizer bar assembly 10 is ready to be assembled directly into the vehicle. This eliminates the prior art system of providing a separate stabilizer bar and bushings which require subassembly at the vehicle manufacturing plant prior to be assembled into the vehicle. Attempting to ship the prior art stabilizer bars as a complete assembly has resulted in the misplacement or loss of the bushings because of the lack of retention of the bushings to the stabilizer bar prior to being installed into the vehicle.

The assembly of stabilizer bar bushing assemblies 14 onto stabilizer bar 12 places a pre-specified percent compression of elastomeric bushing assembly 40. In the preferred embodiment, the percent compression of elastomeric bushing assembly 40 is between 20% and 60% and more preferably it is between 35% and 50%. Due to the relatively high percent compression of elastomeric bushing assembly 40, the slipping between elastomeric bushing assembly 40 and stabilizer bar 12 and between elastomeric bushing and outer metal member 42 is eliminated for specific suspension travel requirements. Any pivoting or rotation of the stabilizer bar 12 during vehicle operation with respect to stabilizer bar bushing assemblies 14 causes wind-up or deflection of elastomeric bushing assembly 40 without slipping between the components. Because the slipping between the components is eliminated, the potential for creating an audible squawk is eliminated. Due to the relatively high percent compression for elastomeric bushing assembly 40, stabilizer bar 12 can rotate up to as much as 60° in either direction without slippage of elastomeric bushing assembly 40. During suspension movement within a vehicle, the full jounce and full rebound positions of the suspension require that stabilizer bar 12 rotate less than this 60° allowable by stabilizer bar bushing assemblies 14 thus eliminating slippage of elastomeric bushing assembly 40. In addition to eliminating slippage of elastomeric bushing assembly 40, the high percent compression for elastomeric bushing assembly 40 also improves steering response for the vehicle, it increases roll stiffness to improve vehicle handling, it enhances on-center steering response and on-center steadiness, it provides better high-speed lane-change stability, it improves overall vehicle handling and lateral stability, it enhances durability and it isolates stabilizer bar 12 and allows for the proper positioning of stabilizer bar 12 relative to the vehicle frame.

Another advantage of the high percent compression of elastomeric bushing assembly 40 of stabilizer bar bushing assemblies 14 is the increase in the lateral/axial restraint of stabilizer bar 12 and the increase in the bending resistance for stabilizer bar 12. The increase in the lateral/axial restraint of stabilizer bar 12 causes stabilizer bar 12 to remain axially or laterally positioned during vehicle maneuvers. By maintaining the proper axial/lateral position, stabilizer bar 12 improves the vehicle handling characteristics. The increase in the bending resistance for stabilizer bar 12 provided by stabilizer bar bushing assemblies 14 increases the pure torsional or rotational movement of stabilizer bar 12 with respect to stabilizer bar bushing assemblies 14. This improves vehicle handling due to the fact that the pivot points or the axis of rotation for stabilizer bar 12 remain more nearly fixed in the radial loaded direction.

Stabilizer bar assembly 10 is manufactured in a unique manner for stabilizer bar assemblies. Once stabilizer bar 12 has been manufactured with the proper configuration, two elastomeric bushing assemblies 40 are located on stabilizer bar 12 at the proper location. Because inside diameter 50 is smaller than the bar diameter for stabilizer bar 12, the interference fit between elastomeric bushing assemblies 40 and stabilizer bar 12 maintain the proper positioning for elastomeric bushing assemblies. A respective outer metal member 42 is assembled over each elastomeric bushing assembly 40 by compressing each elastomeric bushing assembly 40 to a specified percent compression and then inserting each elastomeric bushing assembly 40 within the respective outer metal member 42 to produce stabilizer bar bushing assemblies 14. In the preferred embodiment, the percent compression for each elastomeric bushing assembly 40 is between 20% and 60% and more preferably between 35% and 50%. Stabilizer bar bushing assemblies 14 can be assembled separately or one at a time or stabilizer bar bushing assemblies 14 can be simultaneously assembled. Once assembled, the highly compressed stabilizer bar bushing assemblies 14 provide the advantages detailed above.

The incorporation of rate plate 48 within elastomeric bushing 46 to produce elastomeric bushing assembly 40 provides significant advantages for stabilizer bar stabilizer bar bushing assemblies 14. Upon loading of stabilizer bar 12 at one or both of end sections 18 and 20, elastomeric bushing assembly 40 of stabilizer bar bushing assembly 14 will provide an increased lateral vehicle stability through axial bushing resistance in the form of spring rate and damping. Stabilizer bar bushing assemblies 14 will provide torsional resistance by means of spring rate and damping during loading of stabilizer bar 12 through road inputs such as wheel jounce or rebound. In the situation where the vehicle experiences opposing inputs such as left wheel jounce and right wheel rebound, stabilizer bar bushing assemblies 14 will experience a conical input. Rate plate 48 incorporated within elastomeric bushing 46 of elastomeric bushing assembly 40 provides an increase in confinement factor that has historically reduced and/or eliminated the propensity for bushing walkout failure.

Rate plate 48 adds several benefits to stabilizer bar bushing assemblies that do not incorporate rate plate 48. One advantage is that rate plate 48 adds considerable radial, torsional, conical and axial stiffness to stabilizer bar bushing assembly 14 when compared to a bushing assembly of similar dimensions without rate plate 48. This increase in rate ratios allows for stabilized bar bushing assembly to be smaller in overall size saving both materials and cost.

Another advantage to the use of rate plate 48 is the increase in the confinement ratio realized by incorporating rate plate 48 into elastomeric bushing 46. By adding rate plate 48, the ratio of effective rubber length to the rubber wall thickness increases substantially (two times in some instances). This ratio is considered a key design consideration relating to bushing walkout, a durability problem that has been present in prior art designs. Increasing the confinement ratio decreases the propensity for bushing walkout. The increase in confinement ratio also allows the bushing to be smaller in overall length. This in turn enables the bushing to be used in applications where package size is too small for the prior art bushings.

Figure 8:
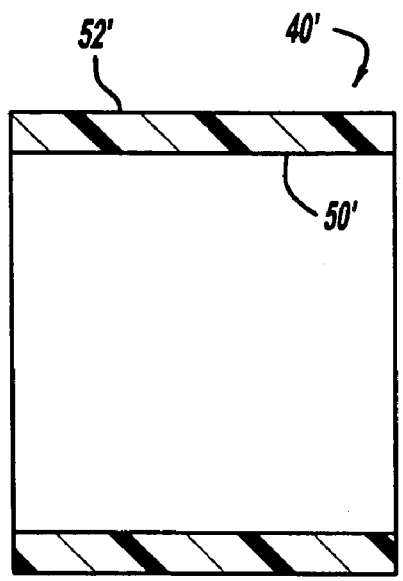
FIG. 8 is a cross-sectional view of an elastomeric bushing in accordance with another embodiment of the present invention.

Referring now to FIG. 8, an elastomeric bushing 40' is illustrated which is a direct replacement for elastomeric bushing assembly 40. Elastomeric bushing 40' is an annular member which includes an inside diameter 50' having a specified dimension and an outside diameter 52' having a specified dimension. Inside diameter 50' is designed to be smaller than the bar diameter for stabilizer bar 12. Outside diameter 52' is designed to be larger than inside diameter 54 of outer metal member 42 when elastomeric bushing 40' is assembled over stabilizer bar 12. This dimensioning provides a specified amount of compression for elastomeric bushing 40' to provide the mechanical friction between elastomeric bushing 40' and stabilizer bar 12 and between elastomeric bushing 40' and outer metal member 42. This mechanical friction allows for torsional wind-up and deflection of elastomeric bushing 40' to prevent any slippage between the mating components.

In the preferred embodiment, the percent compression for elastomeric bushing 40' after it is assembled over stabilizer bar 12 and within outer metal member 42 is between 20% to 60% compression and more preferably it is between 35% and 50%. When the percent of compression for elastomeric bushing 40' is less than 20%, slippage of elastomeric bushing 40' can occur. When the percent of compression for elastomeric bushing 40' exceeds approximately 60%, the assembly of elastomeric bushing 40' and stabilizer bar 12 within outer metal member 42 becomes difficult and/or impractical.

The assembly of stabilizer bar bushing assemblies 14 onto stabilizer bar 12 places a pre-specified percent compression of elastomeric bushing 40'. In the preferred embodiment, the percent compression of elastomeric bushing 40' is between 20% and 60% and more preferably it is between 35% and 50%. Due to the relatively high percent compression of elastomeric bushing 40', the slipping between elastomeric bushing 40' and stabilizer bar 12 and between elastomeric bushing 40' and outer metal member 42 is eliminated for specific suspension travel requirements. Any pivoting or rotation of the stabilizer bar 12 during vehicle operation with respect to stabilizer bar bushing assemblies 14 causes wind-up or deflection of elastomeric bushing 40' without slipping between the components. Because the slipping between the components is eliminated, the potential for creating an audible squawk is eliminated. Due to the relatively high percent compression for elastomeric bushing 40', stabilizer bar 12 can rotate up to as much as 60° in either direction without slippage of elastomeric bushing 40'. During suspension movement within a vehicle, the full jounce and full rebound positions of the suspension require that stabilizer bar 12 rotate less than this 60° allowable by stabilizer bar bushing assemblies 14 thus eliminating slippage of elastomeric bushing 40'. In addition to eliminating slippage of elastomeric bushing 40', the high percent compression for elastomeric bushing 40' also improves steering response for the vehicle, it increases roll stiffness to improve vehicle handling, it enhances on-center steering response and on-center steadiness, it provides better high-speed lane-change stability, it improves overall vehicle handling and lateral stability, it enhances durability and it isolates stabilizer bar 12 and allows for the proper positioning of stabilizer bar 12 relative to the vehicle frame.

Another advantage of the high percent compression of elastomeric bushing 40' of stabilizer bar bushing assemblies 14 is the increase in the lateral/axial restraint of stabilizer bar 12 and the increase in the bending resistance for stabilizer bar 12. The increase in the lateral/axial restraint of stabilizer bar 12 causes stabilizer bar 12 to remain axially or laterally positioned during vehicle maneuvers. By maintaining the proper axial/lateral position, stabilizer bar 12 improves the vehicle handling characteristics. The increase in the bending resistance for stabilizer bar 12 provided by stabilizer bar bushing assemblies 14 increases the pure torsional or rotational movement of stabilizer bar 12 with respect to stabilizer bar bushing assemblies 14. This improves vehicle handling due to the fact that the pivot points or the axis of rotation for stabilizer bar 12 remain more nearly fixed in the radial loaded direction.

Stabilizer bar assembly 10 is manufactured in a unique manner for stabilizer bar assemblies. Once stabilizer bar 12 has been manufactured with the proper configuration, two elastomeric bushings 40' are located on stabilizer bar 12 at the proper location. Because inside diameter 50' is smaller than the bar diameter for stabilizer bar 12, the interference fit between elastomeric bushings 40' and stabilizer bar 12 maintain the proper positioning for elastomeric bushings. A respective outer metal member 42 is assembled over each elastomeric bushing 40' by compressing each elastomeric bushing 40' to a specified percent compression and then inserting each elastomeric bushing 40' within the respective outer metal member 42 to produce stabilizer bar bushing assemblies 14. In the preferred embodiment, the percent compression for each elastomeric bushing 40' is between 20% and 60% and more preferably between 35% and 50%. Stabilizer bar bushing assemblies 14 can be assembled separately or one at a time or stabilizer bar bushing assemblies 14 can be simultaneously assembled. Once assembled, the highly compressed stabilizer bar bushing assemblies 14 provide the advantages detailed above.

Figure 9:
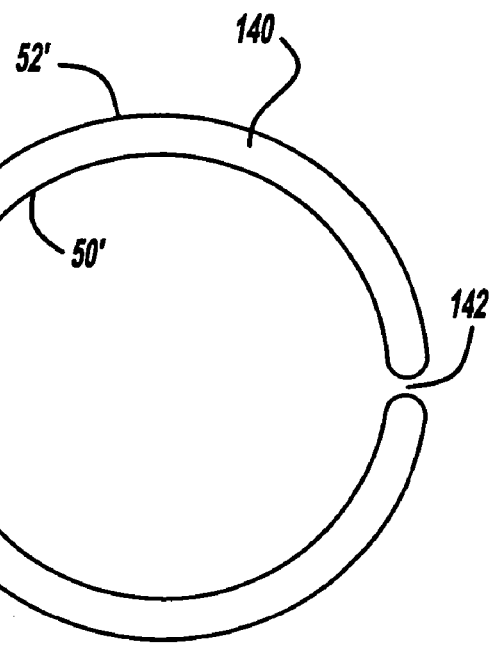
FIG. 9 is an end view of an elastomeric bushing in accordance with another embodiment of the present invention.

Referring now to FIG. 9, an elastomeric bushing 140 is illustrated which is a direct replacement for elastomeric bushing assembly 40 or elastomeric bushing 40'. Elastomeric bushing 140 is similar to elastomeric bushing 40' in that it defines inside diameter 50' and outside diameter 52'. Rather than being an annular or circular in cross-section as is elastomeric bushing 40', elastomeric bushing 140 defines a slit 142 which extends the entire length of bushing 140. Slit 142 allows elastomeric bushing 140 to be opened such that it can be assembled over stabilizer bar 12. The advantage, features and percent of compression discussed above for elastomeric bushing assembly 40 and elastomeric bushing 40' apply also to elastomeric bushing 140.

Referring now to FIG. 9, an elastomeric bushing assembly 240 is illustrated which is a direct replacement for elastomeric bushing assembly 40 or elastomeric bushing 40'. Elastomeric bushing assembly 240 is similar to elastomeric bushing assembly 40 in that it comprises an elastomeric bushing 246 and a pair of rate plates 248. Elastomeric bushing 246 defines inside diameter 50 and outside diameter 52. Rather than being annular or circular in cross-section as is elastomeric bushing assembly 40, elastomeric bushing assembly 240 defines a slit 252 which extends the entire length of elastomeric bushing assembly 240. Slit 242 allows elastomeric bushing assembly 240 to be opened such that it can be assembled over stabilizer bar 12. Rate plates 248 perform the same function as rate plate 48 but the two-piece construction of rate plates 248 rather than the annular or circular cross-section of rate plate 48 permit the opening of elastomeric bushing assembly 240 for the assembling over stabilizer bar 12. The advantages, features and percent of compression discussed above for elastomeric bushing assembly 40 and elastomeric bushing 40' apply also to elastomeric bushing 140.

Figure 11:
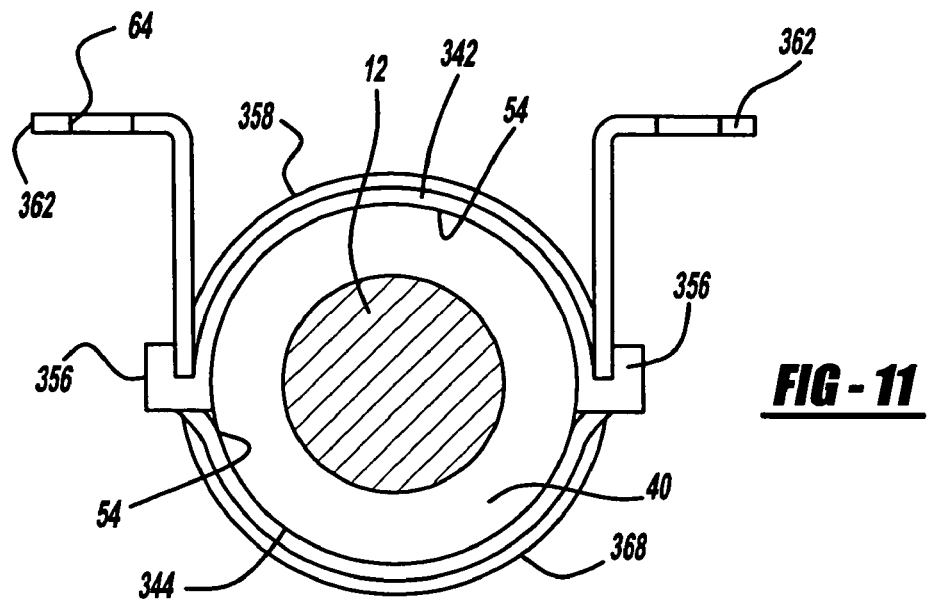
FIG. 11 is an end view of a stabilizer bar bushing assembly in accordance with another embodiment of the present invention.
Figure 12:
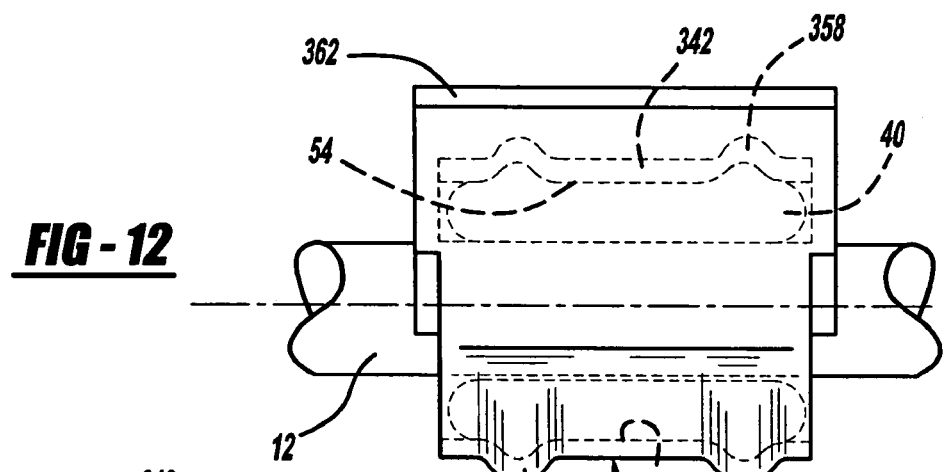
FIG. 12 is a side view of the stabilizer bar bushing assembly illustrated in FIG. 11.
Figure 13:
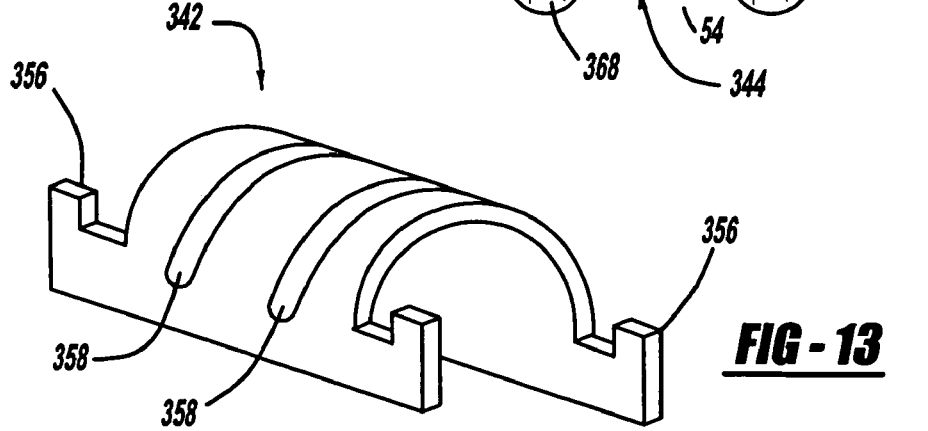
FIG. 13 is a plan view of the outer metal member illustrated in FIGS. 11 and 12.

Referring now to FIGS. 11–13, a stabilizer bar bushing assembly 314 in accordance with another embodiment of the present invention is illustrated. Stabilizer bar bushing assembly is interchangeable with stabilizer bar bushing assembly 14 and it comprises elastomeric bushing assembly 40, an outer metal member 342 and a fastening strap 344.

Outer metal member 342 is a C-shaped component defining inside diameter 54. Outer metal member 342 defines a plurality of locking tabs 356 and a plurality of reinforcement ribs 358. Locking tabs 356 are designed to be formed over to retain the assembly of outer metal member 342 to fastening strap 344 as illustrated in FIGS. 11 and 12. Reinforcement ribs 358 increase the strength of outer metal member 342.

Fastening strap 344 is a U-shaped component defining a pair of flanges 362. Each flange 362 extends outwardly and defines slotted hole 64 which is used to secure stabilizer bar assembly 10 to the sprung mass of the vehicle. Fastening strap 344 defines the other half of inside diameter 54 and a plurality of reinforcement ribs 368.

Once elastomeric bushing assembly 40 is assembled over stabilizer bar 12, outer metal member 342 and fastening strap 344 are assembled over elastomeric bushing assembly 40. Elastomeric bushing assembly is then compressed to the specified percent compression and locking tabs 356 are formed over to engage fastening strap 344 to maintain the assembly with the prespecified percent compression. While stabilizer bar bushing assembly 314 is illustrated using elastomeric bushing assembly 40, it is within the scope of the present invention to also incorporate elastomeric bushing 40', elastomeric bushing 140 or elastomeric bushing assembly 240 into stabilizer bar bushing assembly 314.

Another advantage provided by the present invention is the opportunity to reduce the number of bends present in typical stabilizer bar geometry. Many stabilizer bar designs incorporate a bend in the middle of the stabilizer bar which is intended to prevent the bar from translating laterally in relation to the vehicle. Stabilizer bar lateral translation could cause a condition where the bar contacts the knuckle/spindle assembly. This contact could cause detrimental NVH (noise, vibration and harshness), handling and failure modes relative to the vehicle performance. The reduction of bends in the stabilizer bar geometry could save money by means of design and manufacturing costs.

The stabilizer bar assemblies detailed above all provide increased performance and handling properties for the vehicle to which they are assembled. Upon rotating during either vehicle cornering or during equal articulation of the first and second bushing assemblies, the stabilizer bar assembly imparts resistance to one or both wheel rates A-typical beneficial effect permitting stabilizer bar size reduction. The imparting of this resistance provides improved vehicle steering precision, improved vehicle on center location and precise lateral stabilizer bar location with control in the vehicle. In addition, this imparted resistance contributes to the vehicle resistance to the affect of crowned road surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stabilizer bar assembly comprising:
a stabilizer bar;
a first bushing assembly attached to said stabilizer bar, said first bushing assembly comprising:
a first annular outer metal member disposed entirely around said stabilizer bar; and
a first elastomeric bushing engaging said first outer metal member and said stabilizer bar, said first elastomeric bushing having a prespecified percent compression; wherein
said percent compression is between 20% and 60%.

2. The stabilizer bar assembly according to claim 1, wherein said first bushing assembly includes a mounting strap secured to said first outer metal member.

3. The stabilizer bar assembly according to claim 1, further comprising a second bushing assembly attached to said stabilizer bar, said second bushing assembly comprising:
a second annular outer metal member disposed entirely around said stabilizer bar; and
a second elastomeric bushing engaging said second outer metal member and said stabilizer bar, said second elastomeric bushing having a prespecified percent compression.

4. The stabilizer bar assembly according to claim 3, further comprising a first rate plate disposed within said first elastomeric bushing and a second rate plate disposed within said second elastomeric bushing.

5. The stabilizer bar assembly according to claim 3, wherein said first bushing assembly includes a first mounting strap secured to said first outer metal member and said second bushing assembly includes a second mounting strap secured to said second outer metal member.

6. The stabilizer bar assembly according to claim 1, further comprising a rate plate disposed within said first elastomeric bushing.

7. The stabilizer bar assembly according to claim 1, wherein said percent compression is between 35% and 50%.

8. The stabilizer bar assembly according to claim 1, wherein said first annular outer metal member is a two-piece component.

9. The stabilizer bar assembly according to claim 8, wherein said first elastomeric bushing defines a slit.

10. The stabilizer bar assembly according to claim 1, wherein said first elastomeric bushing defines a slit.

11. A stabilizer assembly comprising:
a stabilizer bar;
a first bushing assembly attached to said stabilizer bar, said first bushing assembly comprising:
a first outer metal member disposed entirely around said stabilizer bar, said first outer metal member defining a first annular gap between said stabilizer bar and an inner surface of said first outer metal member; and
a first elastomeric bushing compressingly disposed within said first annular gap, an outer surface of said first elastomeric bushing being fixed to said inner surface of said first outer metal member and an inner surface of said first elastomeric bushing being fixed to said stabilizer; wherein
said percent compression is between 20% and 60%.

12. The stabilizer bar assembly according to claim 11, wherein said first bushing assembly includes a mounting strap secured to said first outer metal member.

13. The stabilizer bar assembly according to claim 11, further comprising a second bushing assembly attached to said stabilizer bar, said second bushing assembly comprising:
a second outer metal member disposed entirely around said stabilizer bar, said second outer metal member defining a second annular gap between said stabilizer bar and an inner surface of said second outer metal member; and
a second elastomeric bushing compressingly disposed within said second annular gap, an outer surface of said second elastomeric bushing being fixed to said inner surface of said second outer metal member and an inner surface of said second elastomeric bushing being fixed to said stabilizer bar.

14. The stabilizer bar assembly according to claim 13, further comprising a first rate plate disposed within said first elastomeric busing and a second rate plate disposed within said second elastomeric bushing.

15. The stabilizer bar assembly according to claim 13, wherein said first bushing assembly includes a first mounting strap secured to said first outer metal member and said second bushing assembly includes a second mounting strap secured to said second outer metal member.

16. The stabilizer bar assembly according to claim 11, wherein said percent compression is between 35% and 50%.

17. The stabilizer bar assembly according to claim 11, further comprising a rate plate disposed within said first elastomeric bushing.

18. The stabilizer bar assembly according to claim 11, wherein said first annular outer metal member is a two-piece component.

19. The stabilizer bar assembly according to claim 18, wherein said first elastomeric bushing defines a slit.

20. The stabilizer bar assembly according to claim 11, wherein said first elastomeric bushing defines a slit.

21. A stabilizer bar assembly comprising:
a stabilizer bar;
a first bushing assembly attached to said stabilizer bar, said first bushing assembly comprising:
a first elastomeric bushing disposed around said stabilizer bar; and
a first outer metal member disposed entirely around said stabilizer bar in engagement with said first elastomeric bushing, said first elastomeric bushing being compressed by said first outer metal member to a first prespecified percent of compression; wherein
said percent compression is between 20% and 60%.

22. The stabilizer bar assembly according to claim 21, wherein said first bushing assembly includes a mounting strap secured to said first outer metal member.

23. The stabilizer bar assembly according to claim 21, further comprising a second bushing assembly attached to said stabilizer bar, said second bushing assembly comprising:
a second elastomeric bushing disposed around said stabilizer bar; and
a second outer metal member disposed entirely around said stabilizer bar in engagement with said second elastomeric bushing, said second elastomer bushing being compressed by said second outer metal member to a second prespecified percent of compression.

24. The stabilizer bar assembly according to claim 23, further comprising a first rate plate disposed within said first elastomeric busing and a second rate plate disposed within said second elastomeric bushing.

25. The stabilizer bar assembly according to claim 23, wherein said first bushing assembly includes a first mounting strap secured to said first outer metal member and said second bushing assembly includes a second mounting strap secured to said second outer metal member.

26. The stabilizer bar assembly according to claim 21, wherein said percent compression is between 35% and 50%.

27. The stabilizer bar assembly according to claim 21, further comprising a rate plate disposed within said first elastomeric bushing.

28. The stabilizer bar assembly according to claim 21, wherein said first annular outer metal member is a two-piece component.

29. The stabilizer bar assembly according to claim 28, wherein said first elastomeric bushing defines a slit.

30. The stabilizer bar assembly according to claim 21, wherein said first elastomeric bushing defines a slit.

31. A method of assembling a stabilizer bar, said method comprising:
providing a stabilizer bar;
providing an interference fit between said stabilizer bar and an annular bushing;
positioning said annular bushing entirely around said stabilizer bar, said interference fit maintaining said position of said annular bushing around said stabilizer bar;
assembling an outer annular metal member around said annular bushing and around said stabilizer bar by compressing said annular bushing between said stabilizer bar and said outer annular metal; wherein
said assembling step includes compressing said annular bushing to a percent compression between 20% and 60%.

32. The method of assembling a stabilizer bar according to claim 31, wherein said assembling step includes compressing said annular bushing to a percent compression between 35% and 50%.

33. The method of assembling a stabilizer bar according to claim 31, further comprising securing a mounting strap to said outer annular metal member.

34. The method of assembling a stabilizer bar according to claim 31 further comprising locating a rate plate within said annular bushing.

* * * * *

UNITED STATES PATENT AND TRADEMARK OFFICE
CERTIFICATE OF CORRECTION

| | | |
|---|---|---|
| PATENT NO. | : 7,114,712 B2 | Page 1 of 1 |
| APPLICATION NO. | : 10/878622 | |
| DATED | : October 3, 2006 | |
| INVENTOR(S) | : James Lewis et al. | |

Figure 10:
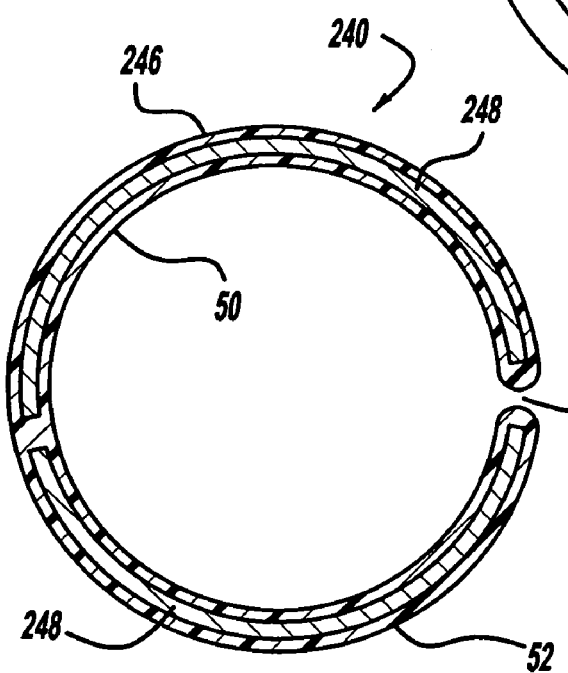
FIG. 10 is a cross-sectional view of an elastomeric bushing assembly in accordance with another embodiment of the present invention.

It is certified that error appears in the above-identified patent and that said Letters Patent is hereby corrected as shown below:

Col. 1, line 15, "bushings" should be --bushing--
Col. 3, line 62, "sectional 16" should be --section 16- --
Col. 4, line 56, "flange 58" should be --flange end 58--
Col. 5, line 9, "be" should be -- being--
Col. 6, line 22, delete "stabilizer bar"
Col. 6, line 45, after "assembly" insert --14--
Col. 8, line 38, "FIG. 9" should be --FIG. 10--
Col. 10, lines 47-48, claim 11, after "stabilizer"
    insert --bar--
Col. 11, line 3, claim 14, "busing" should be --bushing--
Col. 11, line 46, claim 23, "elastomer" should be
    --elastomeric--
Col. 12, line 1, claim 24, "busing" should be --bushing--
Col. 12, line 34, claim 31, after "metal" insert --member--

Signed and Sealed this

Third Day of April, 2007

JON W. DUDAS
*Director of the United States Patent and Trademark Office*